United States Patent [19]

McKnight

[11] 4,020,398

[45] Apr. 26, 1977

[54] VOLTAGE SURGE PROTECTOR

[75] Inventor: Lee Graves McKnight, Convent Station, N.J.

[73] Assignee: Bell Telephone Laboratories, Incorporated, Murray Hill, N.J.

[22] Filed: Dec. 29, 1975

[21] Appl. No.: 645,088

[52] U.S. Cl. .................................. 361/60; 313/217
[51] Int. Cl.[2] ........................................... H02H 9/06
[58] Field of Search ........................ 317/68, 70, 78; 313/208, 217, 349

[56] References Cited

UNITED STATES PATENTS

| | | | |
|---|---|---|---|
| 1,216,538 | 2/1917 | Arco et al. | 313/39 |
| 3,454,811 | 7/1969 | Scudner | 313/220 |
| 3,703,665 | 11/1972 | Yereance et al. | 317/61 |
| 3,898,533 | 8/1975 | Scudner | 317/61 |

FOREIGN PATENTS OR APPLICATIONS

| | | | |
|---|---|---|---|
| 193,282 | 12/1906 | Germany | 317/70 |
| 8,826 | 4/1904 | United Kingdom | 317/78 |

*Primary Examiner*—Harry Moose
*Attorney, Agent, or Firm*—Allen N. Friedman

[57] ABSTRACT

Electrical equipment, such as telephone station apparatus, exposed to occasional, destructively high, voltage surges (e.g., lightning strikes) is protected by a device, placed in parallel with the equipment, including two electrodes defining a fixed narrow spark gap. Such a device is designed to spark over with each surge and to recover afterward, restoring the line to its original condition. The predominant failure mode of such devices is shorting across the narrow gap, due to electrode damage produced during the protective arcing mode. In the disclosed devices, the electrodes define a narrow region, determining the protective breakdown voltage, and a wider region, sustaining the major part of the electrode damage. Shortly after the initiation of the protective discharge in the narrow gap region, the discharge is forced into the wider gap region by the provision, in at least one of the electrodes, of a high resistance path at the narrow gap region. Since the major portion of electrode damage is sustained by the wider gap region of the electrodes, the incidence of shorting failure is suppressed.

11 Claims, 8 Drawing Figures

VOLTAGE SURGE PROTECTOR

BACKGROUND OF THE INVENTION

1. Field of the Invention

The invention is in the field of voltage surge protection devices, such as are used to protect telephone station apparatus from external voltage surges (e.g., lightning strikes and accidental contact between telephone lines and power lines).

2. Brief Description of the Prior Art

In transmission systems with large stretches of outdoor wiring, it is common to protect terminal equipment from voltage surges (e.g., lightning strikes) by the inclusion of a protective device between the line and ground at each terminal. Such devices should be capable of sustaining repeated voltage surges without failing but when they fail, they should fail to an electrically short circuit condition (fail safe). A widely used class of surge protective devices includes two carbon block electrodes with parallel faces defining an air gap of the order of 0.1 millimeter. This is an extremely inexpensive device, however, the labor cost of replacing failed devices in the field is high. Thus, efforts have been continuously made to extend the service life of such devices. One modification which has been developed is the inclusion of grooves in the carbon block face to accept debris formed during the protective breakdown. (U.S. Pat. No. 3,703,665 issued Nov. 21, 1972.) Another class of devices seeks to prolong service life through the use of carbon-coated metal electrodes sealed in a protective environment. Such devices have been made with setbacks in the electrodes to suppress failure produced by the sputtering of conductive material during breakdown (see, for example, U.S. Pat. No. 3,898,533 issued Aug. 5, 1975). These sealed devices are significantly more expensive than carbon block devices. However, when the factors such as the labor cost for replacement of failed devices is taken into account, their use is often indicated.

SUMMARY OF THE INVENTION

A surge protective device has been developed, which, while still inexpensive to fabricate, has greatly extended service life. These devices are generally similar to widely-used surge protective devices. However, the electrodes define two contiguous regions of different gap width. The narrow region defines the breakdown voltage and the wider region sustains the majority of the electrode damage produced during the protective breakdown. The initial discharge takes place in the narrow region and as the current builds, the discharge is driven into the wider gap region and remains there during the high current portion of the discharge. Thus, while the discharge is initiated in the narrow gap region, there is little electrode damage in this region, suppressing the incidence of shorting failure.

In the inventive devices, the discharge is driven from the narrow gap region to the wider gap region by the provision, in at least one of the electrodes, of a higher electrical resistance in the current path to the narrow gap region than in the current path to the wider gap region. Thus, as the discharge current increases a large voltage drop develops in the electrode in the narrow gap current path. Once the arc has been initiated, ionization spreading into the wider gap region reduces the effective resistance of this region. At some current level, then, the total electrical resistance through the electrodes and the wider portion of the gap becomes less than the resistance through the electrodes and the narrow portion of the gap, forcing the discharge into the wider portion. Exemplary carbon block devices incorporating a high resistivity carbon center post have exhibited a more than ten fold increase in the median number of discharges before failure (under laboratory test conditions) than standard carbon protectors. When these devices did fail they failed in an electrically shorted condition (fail safe).

DETAILED DESCRIPTION OF THE INVENTION

1. The Device

Figure 1:
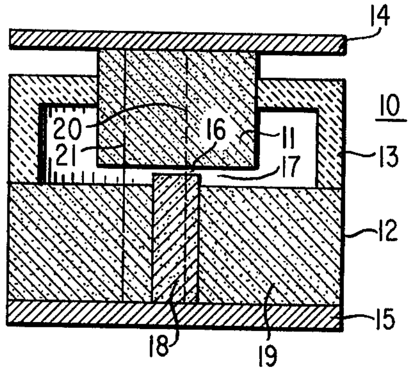
FIG. 1 is an elevational view in section, partly schematic, of an exemplary surge protector of the invention.

FIG. 1 shows, partly in schematic form, the basic elements of an exemplary surge protector of the invention. The two electrodes 11, 12 are held in a predetermined fixed relation to one another by an insulator 13 and are connected across the device being protected, through the metal contacts 14, 15. The electrodes 11, 12 define a narrow gap region 16 and a wider gap region 17. During the normal operation of the transmission system in which the surge protector is incorporated, the voltage across the device 10 is much less than is required to produce gaseous ionization in the gap 16, 17. During abnormally high voltage surges, the large electric field in the narrow gap region 16 produces ionization of the gas and a gaseous plasma discharge (arc). Once this discharge has been formed, the surge protector appears as a short to ground thus protecting the terminal device across which it is connected. Discharges of this sort produce a great deal of thermal and ion bombardment damage to the electrodes.

The most common failure mode of such a device is the occurrence of a short circuit across the gap due to such electrode damage (typical gap spacings are of the order 0.1 millimeter). In the device of the invention, the discharge is forced from the narrow gap region 16 into a wider gap region 17 as the current through the device increases. Thus the majority of the electrode damage takes place in the wider gap region 17 making this device much less susceptible to shorting failure. This arc transfer is produced by the provision of a higher resistance path through at least one electrode in the narrow gap region 16 than in the wider gap region 17.

The device of FIG. 1 includes a center post 18 of a high resistivity material, defining the narrow gap region 16, and surrounding body 19 of a lower resistivity material. Before the initiation of gaseous breakdown the maximum field strength is in the narrow gap region 16 and the initial discharge takes place there. Initial current flow then follows the path shown schematically as 20. However, once the discharge has been initiated the spread of ions into the wider gap region 17 reduces the effective breakdown voltage of the wider gap region 17 and at some current level the additional voltage drop across the high resistivity material 18 becomes higher than the voltage drop which would be necessary to sustain an arc across the wider gap region 17. At that time the arc forms in the wider gap region 17 and the path of least resistance 21 passes through the wider gap region 17. Once the arc has formed in the wider gap region 17, the arc in the narrow gap region 16 is extinguished.

Exemplary devices of this type have been made using carbon electrodes. Low resistivity electrodes are formed from mixtures of carbon black and powdered coke in a coal tar pitch binder in accordance with the procedures of an old and well developed art. The mixture is formed into the desired shape and baked to achieve the desired material resistivity. Exemplary low resistivity carbon blocks are of the order of 0.01 Ω-cm. High resistivity materials have been formed from the same coke-pitch-carbon black mixture baked at a lower temperature to give a room temperature resistivity of the order 0.1Ω-cm or higher. High resistivity electrode posts have also been made from a clay carbon mixture (6H pencil lead) with a room temperature resistivity of ~0.04Ω-cm. The high resistivity materials have been formed in the shape of posts 18 and inserted into the low resistivity electrodes 19 with a suitable binding material. The binding materials have ranged from coal tar pitch through epoxy cement. Some blocks have been constructed without a binding material using a simple press fit. Since the operation of the device depends on the net resistance to the top of the post 18, the binding material (or the surface resistance in the case of a press fit) can play a part in the operation of the device.

Figure 2:
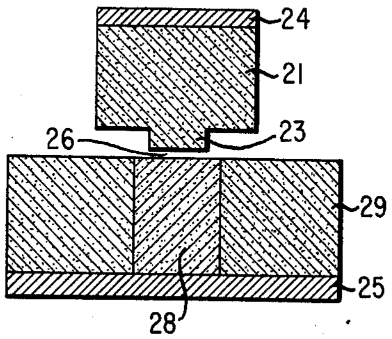
FIG. 2 is an elevational view in section of a second exemplary electrode configuration.
Figure 3:
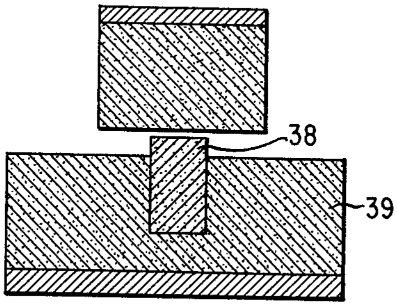
FIG. 3 is an elevational view in section of a third exemplary electrode configuration.
Figure 4:
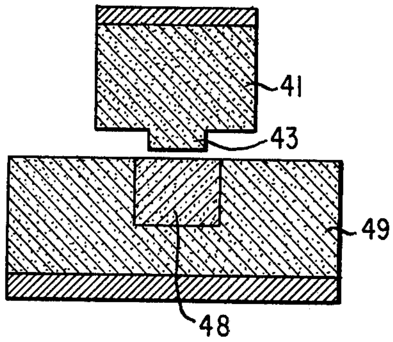
FIG. 4 is an elevational view in section of a fourth exemplary electrode configuration.
Figure 5:
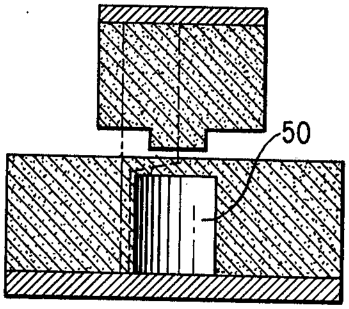
FIG. 5 is an elevational view in section of a fifth exemplary electrode configuration.
Figure 6:
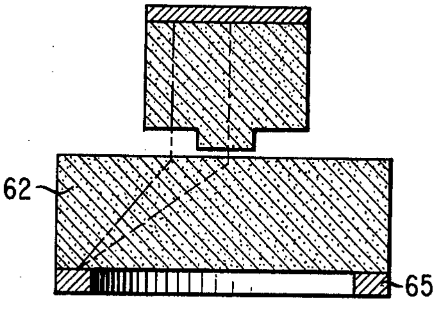
FIG. 6 is an elevational view in section of a sixth exemplary electrode configuration.
Figure 7:
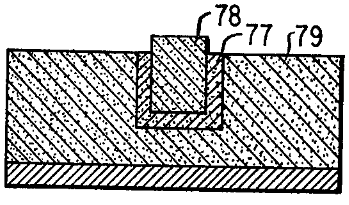
FIG. 7 is an elevational view in section of a seventh exemplary electrode configuration.

For best operation of the device it is considered that at least one of the electrodes should be provided with a resistance from the external contact to the narrow gap area at least one quarter Ohm higher than the resistance from the external contact to the wider gap area. A preferred minimum resistance difference is 1 Ohm. It is estimated that in many geometries this would limit the discharge current through the narrow gap region to approximately 10 amperes; thus, limiting electrode damage in the narrow gap region to an acceptable level. The electrical resistance in the narrow gap region should not be more than 1000 Ohms in order to be compatible with shorting failure restoration procedures commonly used in telephone transmission networks. The electrical resistance in the path through the wide gap region should be less than 1Ω in order to maintain a low voltage across the device when conducting high current surges. The electrical resistance spoken of above can be measured experimentally using a four point probe or by the application of a small area of silver paste at the two sides of the electrode across which the resistance is to be measured. Since the resistance for a current surge will depend on the area of the arc anode and cathode, the measured resistance will refer to an arc of given size. Many other electrode configurations and materials are possible within the scope of the invention. Several exemplary configurations are illustrated in the remaining figures. In FIG. 2 the high resistivity material 28 is coplanar with the lower resistivity material 29 and the narrow portion of the gap 26 is produced by a post 23 in the electrode 21 of uniform material. The external contacts 24, 25 are also indicated. In such a device it is desirable that the region of higher resistivity material 28 extend beyond the gap defining post 23 and must be at least as extensive as this post 23. The resistive central region 28 may also be produced by differential firing of a unitary molded electrode producing a continuous variation of resistivity. In FIG. 3 it is shown that the body of high resistivity material 38 need not extend completely through the body of lower resistivity material 39. FIG. 4 shows coplanar regions of higher resistivity 48 and lower resistivity 49 materials and a gap defining post 43 in the uniform electrode 41. FIG. 5 illustrates a somewhat different sub-class of devices of the invention in which the path resistance differential is produced within an electrode of uniformly resistive material. In FIG. 5 the increased resistance in the narrow gap current path is produced by the inclusion of a void 50 such that the current through the narrow gap region is geometrically restricted to a thin portion, producing higher electrical resistance. In FIG. 6 the external contact area 65 contacting one of the electrodes 62 is configured so as to provide a longer path length through the narrow gap region. If the material of this electrode 62 is of sufficiently high resistivity, the longer path length will possess a sufficiently higher electrical resistance to produce operation of such a device within the scope of the invention. In FIG. 7 a post 78 and body 79 of low resistivity material are separated by a region 77 of higher resistivity material.

2. Examples

A test series of 100 carbon block surge protectors with an electrode configuration similar to that illustrated in FIG. 1 was produced using a baked carbon material as the low resistivity portion 19 of the lower electrode 12 and all of the upper electrode 11. The high resistivity center post 18 was a clay-carbon mixture (6H pencil lead). The low resistivity material was a typical baked carbon made from lamp black, powdered coke and pitch. Piece parts are molded to the desired shape and baked to produce amorphous carbon blocks of resistivity approximately 0.01 Ohm centimeters. The 6H pencil lead consists essentially of carbon particles in a clay binder and was cemented into the amorphous block using both conducting and non-conducting epoxy cement. The lengths of pencil leads (1/16 in) and the cement employed combined to produce a total resistance of greater than 1 Ohm whereas the lower resistivity electrode materials of both electrodes possessed a resistance of less than 1 Ohm. The pencil leads were used in the experimental devices because of their convenience and availability; however, many other methods of achieving compatible higher resistivity materials are known in the art. For example, by merely modifying the baking conditions of materials such as those used to fabricate the lower resistivity portions. The exemplary devices were fabricated with a narrow gap region approximately 0.08 millimeters wide and a wider gap region approximately three times as wide. The wider region should be at least 50 percent wider than the narrow region in order to obtain significantly greater service life.

The devices were tested in a test set which repeatedly imposed 100 ampere (peak) current pulses with a 10 microsecond rise time and 1000 microsecond decay time. In one exemplary series of 28 devices so tested the median life to failure was 246 surges with no units failing in the first 29 surges. These results are to be compared with the results of similar tests on similarly composed devices without the high resistivity center post and a uniformly thick gap of width equal to the narrow gap width of the device of FIG. 1. Such devices showed a median life to failure of 27 surges with 20 percent of the units failing on the first or second surge. This experiment, of course, represents devices made by the described construction technique. It must be said, however, that during these developments, first surge failures of inventive devices were observed.

Figure 8:
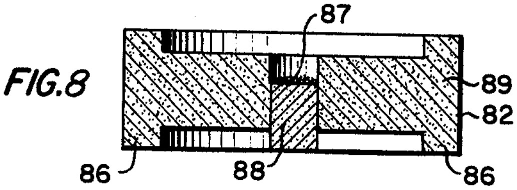
FIG. 8 is an elevational view in section of a seventh exemplary surge protector of the invention in an early stage of fabrication.

FIG. 8 shows an exemplary lower electrode 82 (this would correspond to element 12 of FIG. 1) in an early stage of fabrication. The high resistivity portion is made from green carbon baked at 300° C for 100 min. The lower resistivity portion 89 and higher resistivity portion 88 are assembled together with a quantity of coal tar pitch 87 with a softening point of 100° C. The assembly is placed in an oven and baked in an enclosed muffle at 600° C for 1 hour. The pitch melts, runs down in between the component elements 88, 89 and then carbonizes cementing the electrode 82 into a unitary body. At the same time the resistivity and mechanical properties of the high resistivity portion 82 are modified to produce longest life. In use, as compared to element 12 in FIG. 1, the electrode is reversed with the shoulder area 86 resting against the insulator 13. Using devices with a well depth of 0.2 mm, a series of 18 devices so constructed was tested using the previously described 100 A peak surges. A median life of 190 surges was obtained with only two devices failing at less than 100 surges.

What is claimed is:

1. An overvoltage surge protector comprising a first electrode, a second electrode and a housing including means for maintaining the first electrode and the second electrode in spaced relationship to one another and electrically insulated from one another, the said electrodes each possessing a broad face and an external contact area, the broad face of said electrodes defining a gap therebetween, the gap so defined including at least a narrow portion and a contiguous wider portion CHARACTERIZED IN THAT at least one of the electrodes possesses a higher electrical resistance from the external contact area to the narrow portion of the gap than its electrical resistance from the external contact area to the wider portion of the gap; wherein the difference between the electrical resistance from the external contact area to the narrow portion of the gap and the electrical resistance from the external contact area to the wider portion of the gap is from one Ohm to $10^3$ Ohms.

2. A device of claim 1 in which the electrodes consist essentially of carbon.

3. A device of claim 1 in which, in at least one electrode, the electrical path length from the external contact area to the narrow portion of the gap is longer than the electrical path length from the external contact to the wider portion of the gap.

4. A device of claim 1 in which at least one electrode includes a thin portion at the narrow region of the gap, at least as extensive as the narrow region of the gap.

5. A device of claim 1 in which the wider portion of the gap is at least 50 percent wider than the narrow portion of the gap.

6. A device of claim 1 in which at least one electrode consists essentially of a body of relatively higher resistivity material at the narrow portion of the gap and a relatively lower resistivity material at the wider portion of the gap.

7. A device of claim 6 in which the relatively low resistivity material consists essentially of a baked mixture of lamp black and powdered coke, with a coal tar pitch binder.

8. A device of claim 7 in which the relatively higher material is similarly composed.

9. A device of claim 7 in which the relatively higher resistivity material includes carbon and clay.

10. A device of claim 1 in which the additional electrical resistance occurs in the interface between two electrode portions.

11. A device of claim 1 in which the higher electrical resistance is produced by a continuous variation in the electrical resistivity of at least one electrode.

* * * * *